(12) United States Patent
Foerster et al.

(10) Patent No.: US 10,396,415 B2
(45) Date of Patent: Aug. 27, 2019

(54) COOLING PLATE

(71) Applicant: MAHLE International GmbH, Stuttgart (DE)

(72) Inventors: Klaus Foerster, Ludwigsburg (DE); Daniel Hendrix, Fellbach (DE); Stefan Hirsch, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 313 days.

(21) Appl. No.: 15/450,448

(22) Filed: Mar. 6, 2017

(65) Prior Publication Data

US 2017/0179555 A1    Jun. 22, 2017

Related U.S. Application Data

(63) Continuation of application No. PCT/EP2015/069868, filed on Aug. 31, 2015.

(30) Foreign Application Priority Data

Sep. 4, 2014  (DE) .......................... 10 2014 217 728

(51) Int. Cl.
*F28F 1/10* (2006.01)
*H01M 10/6556* (2014.01)
(Continued)

(52) U.S. Cl.
CPC ......... *H01M 10/6556* (2015.04); *F28F 3/044* (2013.01); *F28F 3/12* (2013.01);
(Continued)

(58) Field of Classification Search
CPC ........... H01M 10/6556; H01M 10/613; H01M 10/625; H01L 23/473; F28F 3/044;
(Continued)

(56) References Cited

U.S. PATENT DOCUMENTS 9,366,486 B2    6/2016 Schmid et al.
9,531,045 B2    12/2016 Girmscheid et al.
(Continued)

FOREIGN PATENT DOCUMENTS

CA    2 451 428 A1    5/2005
CN    103715471 A     4/2014
(Continued)

*Primary Examiner* — Davis D Hwu
(74) *Attorney, Agent, or Firm* — Muncy, Geissler, Olds & Lowe, P.C.

(57) ABSTRACT

A cooling plate with a structural plate and a cover plate, wherein the structural plate has a channel-like recess which is enclosed by a raised edge region. The cover plate rests on the raised edge region and covers the channel-like recess in order to form a channel. Openings with connection elements arranged at the openings are provided in the structural plate and/or in the cover plate in order to let a fluid into the channel and to let a fluid out of the channel. A first mounting opening, which is in the form of a round hole, and a second mounting opening, which is in the form of an elongate hole, are provided in both the structural plate and in the cover plate, the respective first and second mounting openings being aligned with one another in order to receive a pin for fixing the two plates during a soldering process.

18 Claims, 9 Drawing Sheets

(51) Int. Cl.
  *F28F 3/12* (2006.01)
  *H01M 10/625* (2014.01)
  *H01M 10/6557* (2014.01)
  *H01M 10/613* (2014.01)
  *F28F 3/04* (2006.01)

(52) U.S. Cl.
  CPC ....... *H01M 10/613* (2015.04); *H01M 10/625* (2015.04); *H01M 10/6557* (2015.04); *F28F 2275/06* (2013.01); *F28F 2275/143* (2013.01)

(58) Field of Classification Search
  CPC ...... F28F 3/12; F28F 13/06; F28F 3/08; F28F 3/083; F28F 2280/04
  USPC ........................................ 165/80.4, 168, 170
  See application file for complete search history.

(56) References Cited

U.S. PATENT DOCUMENTS

| | | | | |
|---|---|---|---|---|
| 2003/0127218 A1* | 7/2003 | Sears | ...................... | F24H 3/105 165/170 |
| 2003/0178182 A1* | 9/2003 | Pikovsky | .................. | F28F 3/12 165/80.4 |
| 2004/0062006 A1* | 4/2004 | Pfeifer | ...................... | F28F 3/12 361/699 |
| 2005/0115700 A1 | 6/2005 | Martin et al. | | |
| 2005/0115701 A1* | 6/2005 | Martin | .................. | F28D 1/0383 165/170 |
| 2007/0163765 A1* | 7/2007 | Rondier | ................ | H01L 23/473 165/170 |
| 2011/0088600 A1* | 4/2011 | MacRae | .................. | C21B 7/163 110/182.5 |
| 2013/0014923 A1* | 1/2013 | Girmscheid | ........ | H01M 10/625 165/168 |
| 2014/0216702 A1* | 8/2014 | Vallee | ..................... | F28F 3/044 165/168 |
| 2015/0086831 A1* | 3/2015 | Haussmann | ........ | H01M 10/625 429/120 |
| 2016/0036104 A1* | 2/2016 | Kenney | ............ | H01M 10/6556 429/120 |
| 2016/0049705 A1* | 2/2016 | Mahe | .................. | H01M 10/625 429/120 |

FOREIGN PATENT DOCUMENTS

| | | |
|---|---|---|
| DE | 11 2004 002 278 T5 | 11/2006 |
| DE | 10 2007 003 920 A1 | 7/2008 |
| DE | 20 2012 102 349 U1 | 9/2012 |
| WO | WO 2012/055044 A1 | 5/2012 |

* cited by examiner

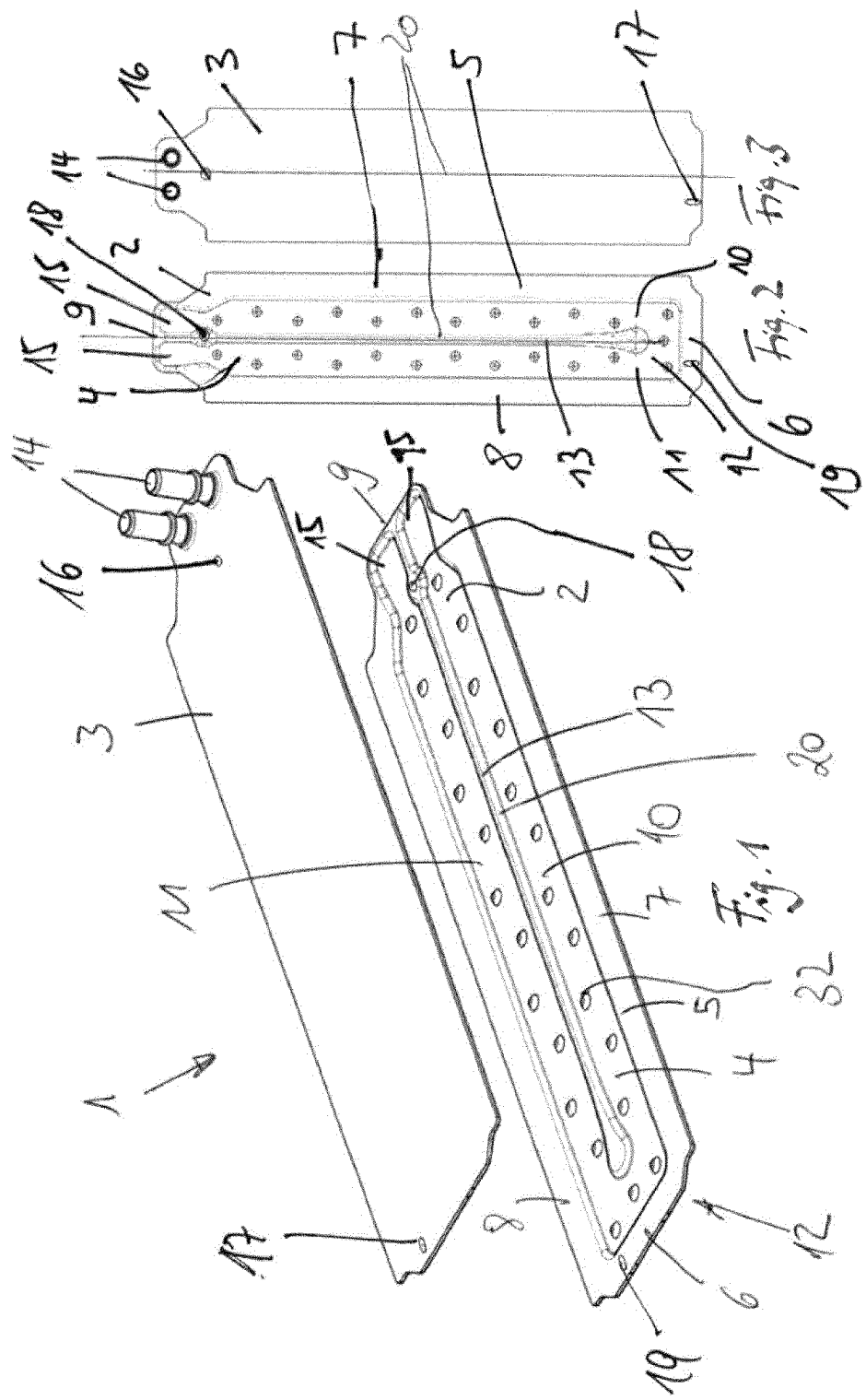

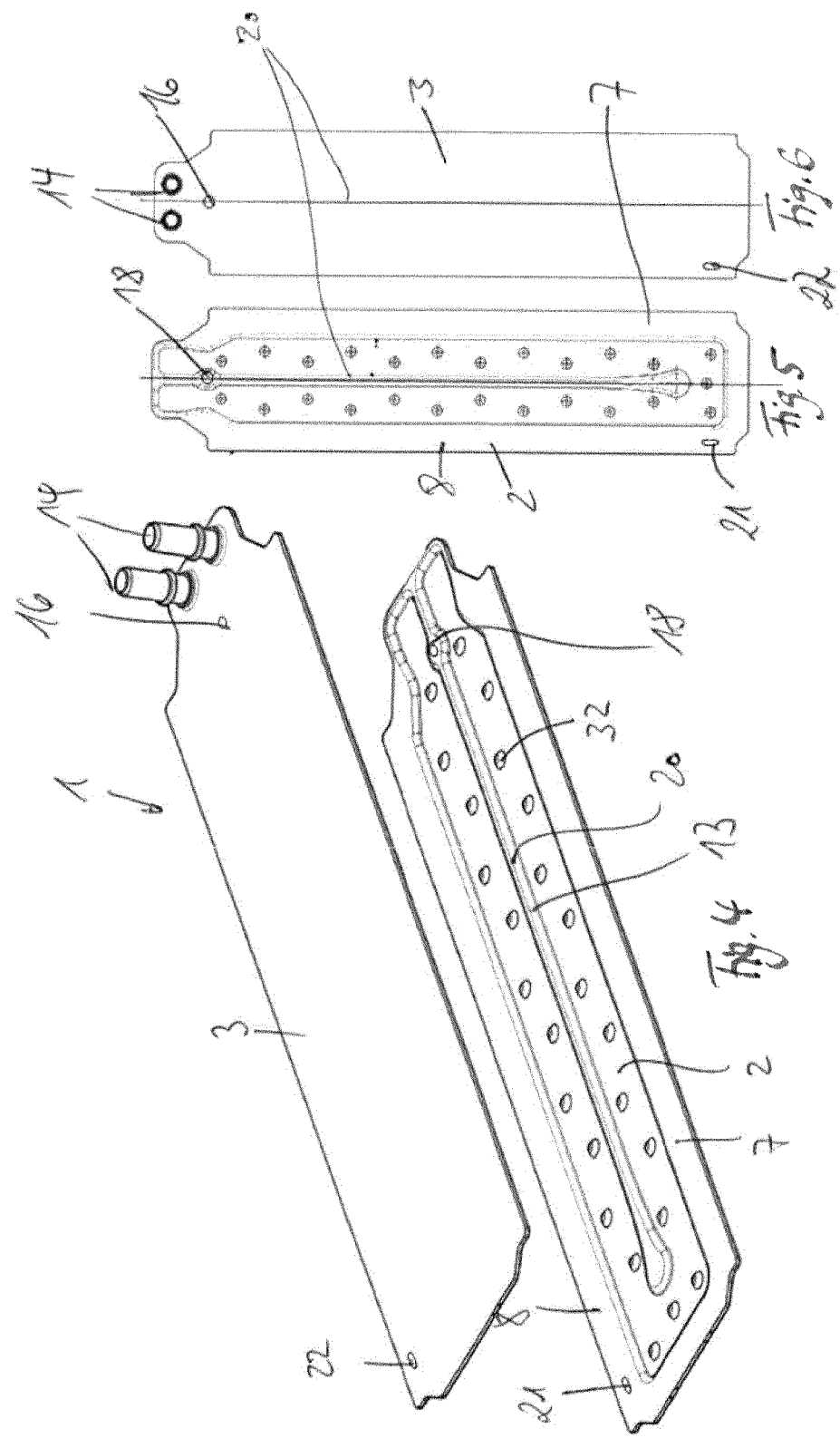

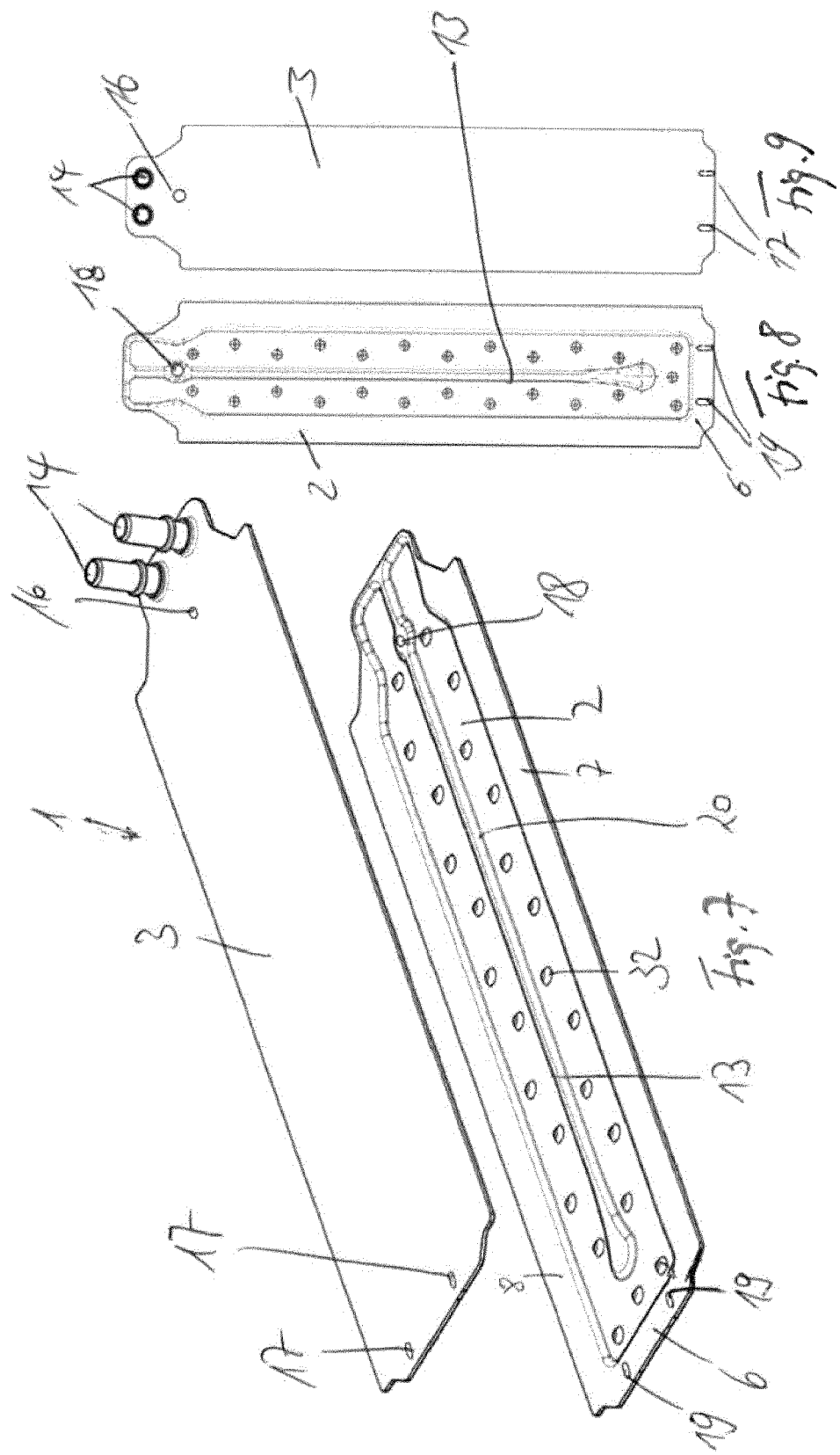

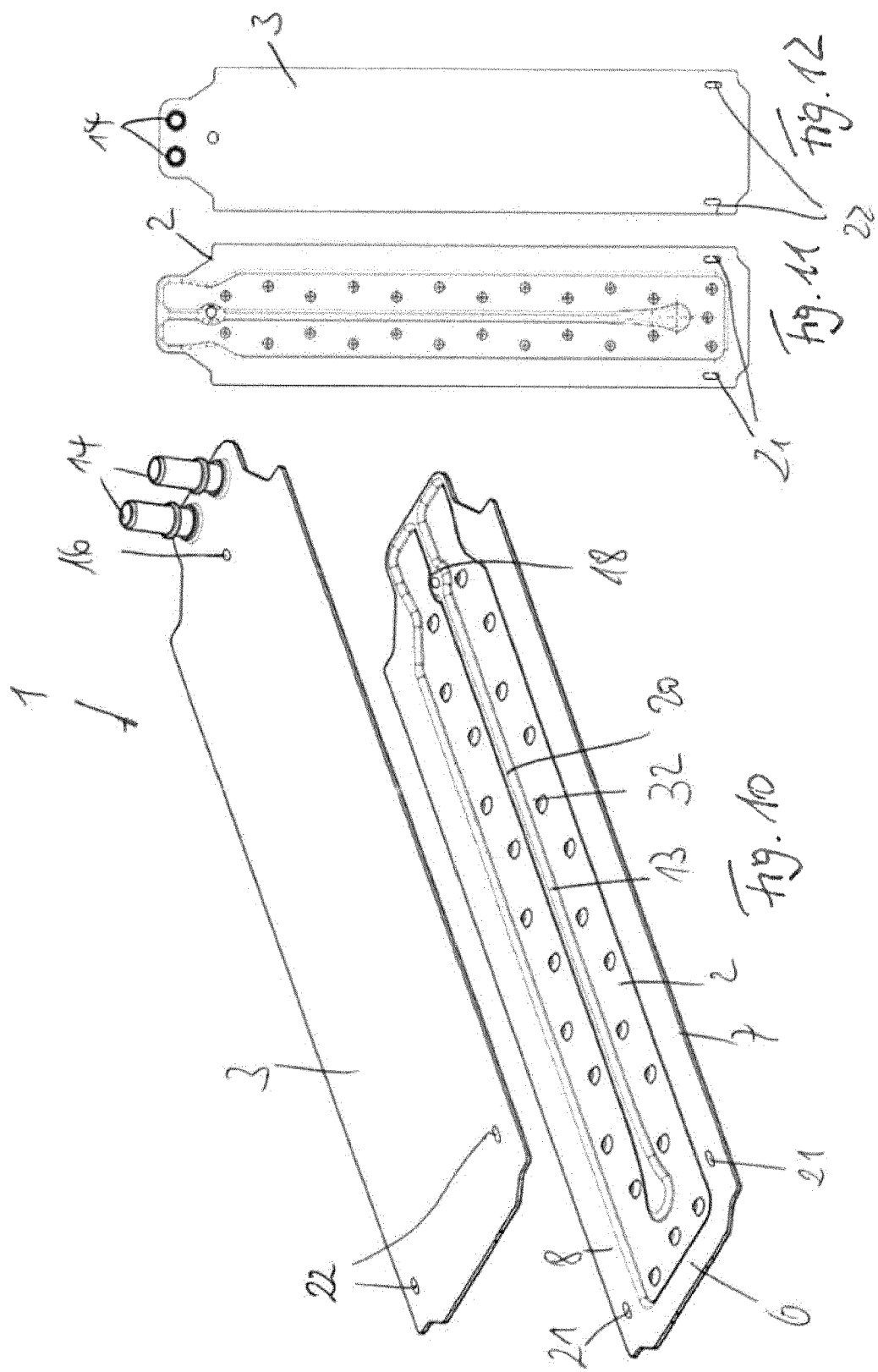

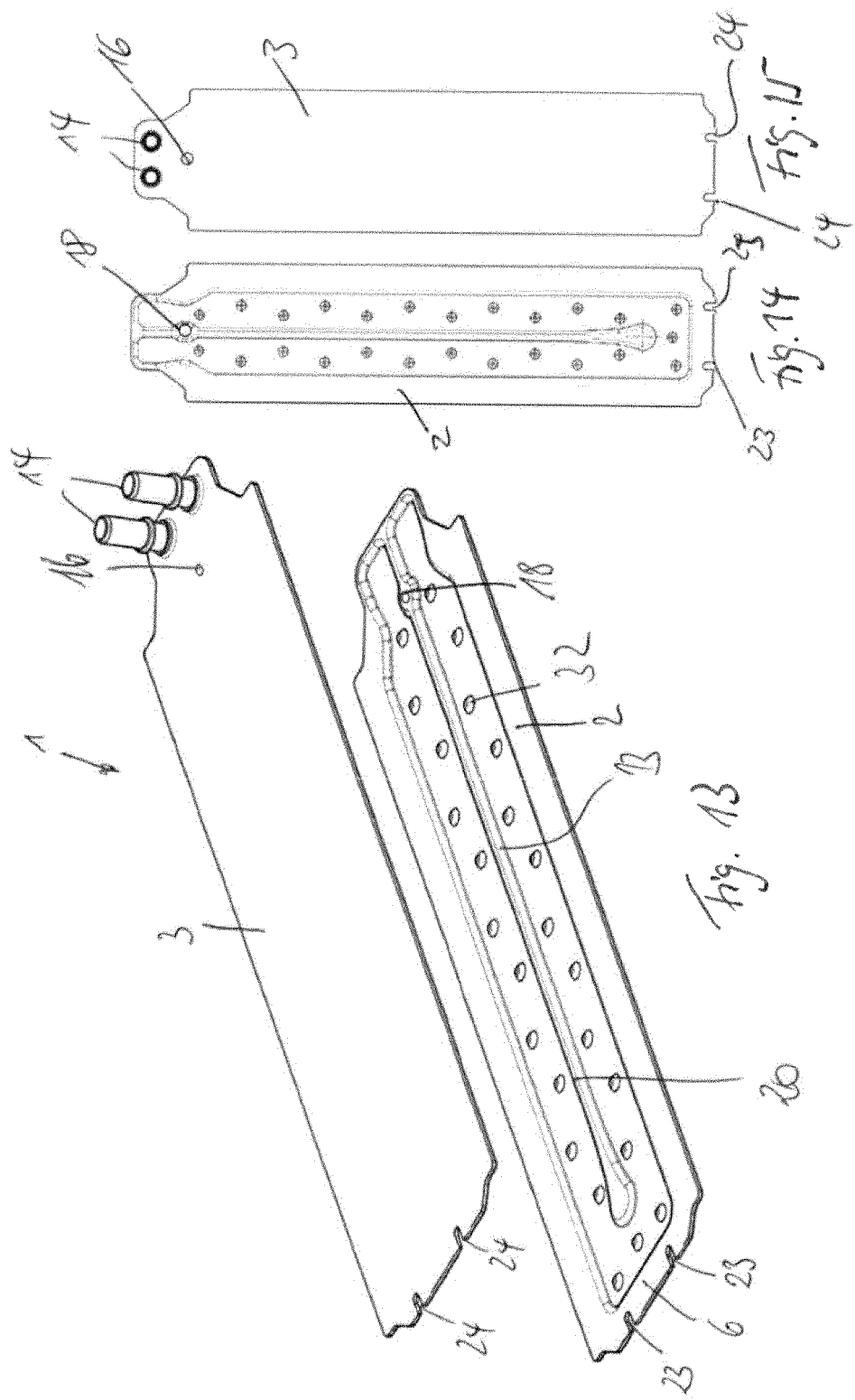

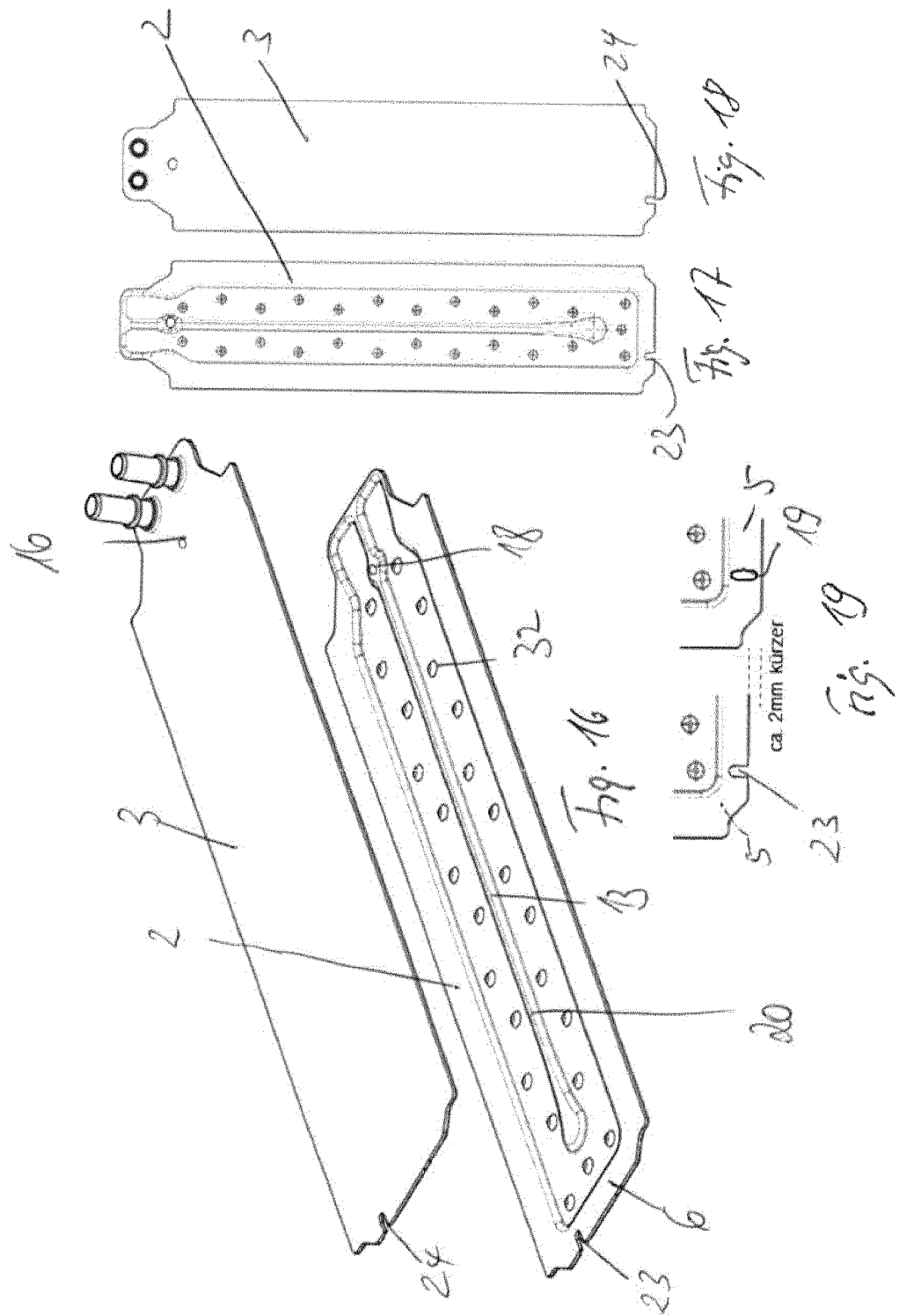

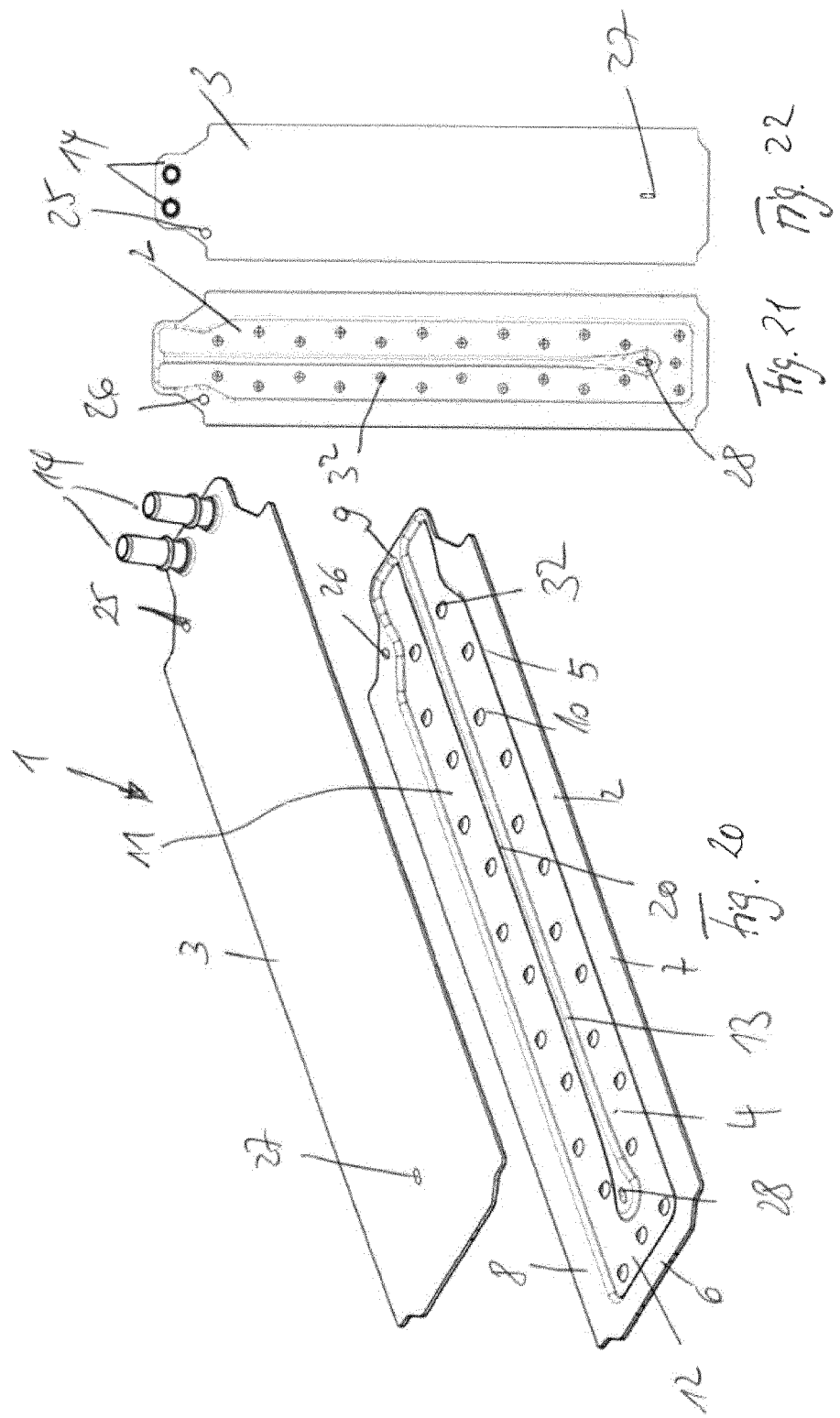

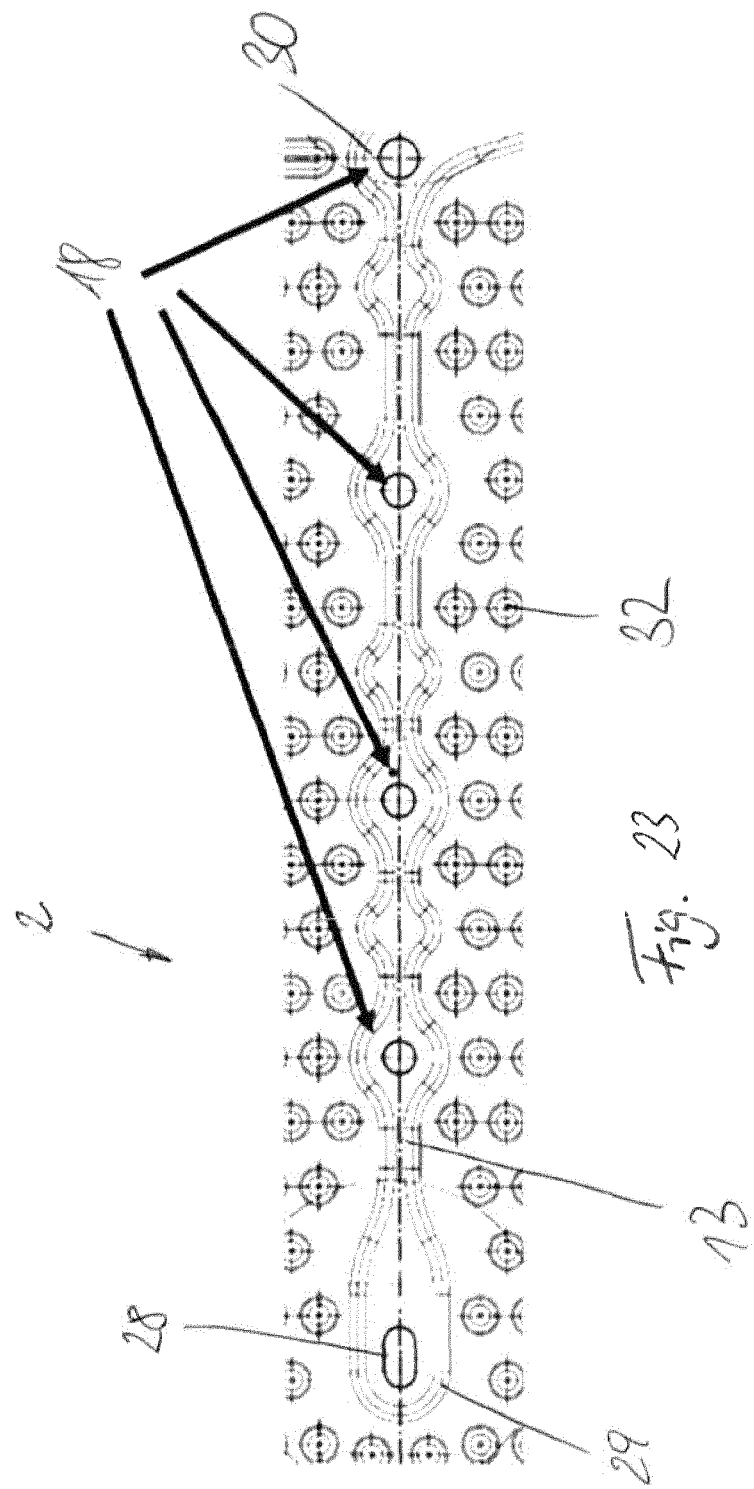

COOLING PLATE

This nonprovisional application is a continuation of International Application No. PCT/EP2015/069868, which was filed on Aug. 31, 2015, and which claims priority to German Patent Application No. 10 2014 217 728.6, which was filed in Germany on Sep. 4, 2014, and which are both herein incorporated by reference.

BACKGROUND OF THE INVENTION

Field of the Invention

The present invention relates to a cooling plate, in particular for cooling a battery or battery components of a battery for motor vehicles.

Description of the Background Art

Cooling plates have become known in the prior art for cooling batteries. The cooling plate is formed by a structural plate and a cover plate covering the latter. The structural plate has a channel-like recess which forms a channel, which leads from an inlet opening to an outlet opening, the cover plate closing off the channel-like recess. A flange is arranged on the cover plate, which flange has an inlet and an outlet channel, which communicate with the openings in order to guide a fluid into the channel and out of the channel of the cooling plate. Such cooling plates are known from DE 20 2012 102 349 U1, which corresponds to U.S. Pat. No. 9,531,045. In this case, the structural plate and the cover plate are arranged in a soldering frame for soldering in a sealing and connective manner, wherein the plates are arranged for guiding by means of pins through openings. In this case, an opening is designed as a round hole with a pin in a precisely fitting manner, a second opening being designed as an elongate hole, into which a pin is also slidably received. Due to the precise arrangement of the pin into the one opening formed as a round hole, the plates are centered with one another, wherein the pin in the elongate hole constitutes a secure positioning which is effective even in the case of thermal expansion of the plates. The two openings in the plates are arranged in the symmetry line of the plates, resulting in space problems.

SUMMARY OF THE INVENTION

It is therefore an object of the invention to provide a cooling plate which requires a small installation space and can nevertheless be securely fixed during the soldering process.

In an exemplary embodiment of the invention, a cooling plate with a structural plate and a cover plate is provided, wherein the structural plate has a channel-like recess which is surrounded by a raised edge region, the cover plate, which is, if necessary, substantially planar, rests on the raised edge region and covers the channel-like recess in order to form a channel, wherein openings with connection elements arranged thereon are provided in the structural plate and/or in the cover plate, for admitting a fluid into the channel and for discharging a fluid from the channel, wherein in the structural plate and in the cover plate, in each case a first mounting opening designed as a round hole and a second mounting opening designed as an elongate hole are provided, the round holes and the elongate holes being respectively aligned with each other and aligned with each other for accommodating a pin for fixing the two plates during the soldering process, wherein at least one of the two plates is arranged away from a line of symmetry of the structural plate and the cover plate. As a result, the pins can be arranged further away from one another for fixing purposes, which permits easy assembly and is favorable for the space requirement.

At least one of the two mounting openings can be arranged on the line of symmetry of the structural plate and the cover plate, while the other of the two mounting openings is arranged away from the line of symmetry.

Both mounting openings can be arranged away from the line of symmetry of the structural plate and the cover plate.

The channel-like recess can be formed in a U-shape with two essentially parallel legs which are designed to be connected to each other at one of their end regions and which are surrounded by the raised edge region, the two limbs being separated from one another by a raised web. As a result, good heat transfer is achieved when the fluid guided through the cooling plate is guided with a deflection in the plane of the cooling plate. Thus, the fluid flowing through the cooling plate is guided through the cooling plate over a longer flow path.

The first mounting opening, which can be designed as a round hole, can be arranged on the line of symmetry in the region of the raised web, the second mounting opening, which is designed as an elongate hole, being arranged away from the line of symmetry in the region of the raised edge region. In this way, in each case a region of the cooling plate is used, which is spaced away from the flow channel of the fluid and thus also causes no leakage problems.

Alternatively, the first mounting opening, which is designed as a round hole, can also be arranged in the region of the raised edge region, away from the line of symmetry, wherein the second mounting opening designed as an elongate hole is correspondingly arranged on the line of symmetry in the region of the raised web.

The raised edge region may be formed by two longitudinal regions arranged essentially parallel to one limb and two transverse regions connecting the two longitudinal regions. In this way, a peripherally extending edge region can be defined, on which the cover plate can be laid sealingly.

The elongate hole or the round hole can be arranged in one of the longitudinal regions. This way, an arrangement away from the line of symmetry is selected.

The elongate hole or the round hole can be arranged in one of the transverse regions. This way, the position of the elongate hole or round hole can also be selected away from the line of symmetry.

At least one elongate hole can be arranged in the structural plate and in the cover plate, the elongate holes being aligned in pairs when the cover plate rests on the structural plate, wherein the respective elongate holes are arranged in a longitudinal region or in a transverse region, or that in each case elongate holes are arranged in each of the longitudinal regions. As a result, the elongate holes are arranged either in the longitudinal or the transverse region, and an arrangement of several elongate holes is also provided. Thus, fixing can be improved, if necessary, if more than one elongate hole is provided per cover plate and structural plate.

Furthermore, in an exemplary embodiment of the invention, it is advantageous if the elongate hole(s) is or are formed as open on one side or closed. In the arrangement of the elongate holes open on one side, the edge region of the cover plate and/or structural plate can be narrower, which can help to save installation space or make the flow channel larger.

The raised web can have a widening in the area of introduction of a round hole or an elongate hole. As a result, the distance to the channel can be increased in order to further reduce the risk of leakage.

A plurality of further openings can be provided in the raised edge region. These openings preferably serve for the improved soldering of the structural plate and the cover plate on account of an enlarged surface. Thus, by introducing these additional openings, the width of the raised edge can also be reduced, if necessary.

The further openings can be arranged uniformly, irregularly or distributed in groups in the raised edge region. Thus, a uniform improvement in the soldering process or a locally defined improvement can be achieved.

The structural plate(s) and/or the cover plate(s) can have projecting impressions in the region of the channel-like recess, which protrude into the channel. By means of these projecting impressions, the heat transfer between the fluid that is flowing through and the wall is improved. Also, an impression can be designed so deep that it projects only partially into the channel, wherein on the other hand, the impression can also be designed so deep as to touch the opposing plate, so as to be soldered there, which increases stability, in particular, the bursting strength.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is an arrangement of a structural plate and a cover plate in a three-dimensional view, FIG. 2 is a structural plate according to FIG. 1 from above, FIG. 3 is a cover plate according to FIG. 1 from above, FIG. 4 is an arrangement of a structural plate and a cover plate in a three-dimensional view, FIG. 5 is a structural panel according to FIG. 4 from above, FIG. 6 is a cover plate according to FIG. 4 from above, FIG. 7 is an arrangement of a structural plate and a cover plate in a three-dimensional view, FIG. 8 is a structural plate according to FIG. 7 from above, FIG. 9 is a cover plate according to FIG. 7 from above, FIG. 10 is an arrangement of a structural plate and a cover plate in a three-dimensional view, FIG. 11 is a structural plate according to FIG. 10 from above, FIG. 12 is a cover plate according to FIG. 10 from above, FIG. 13 is an arrangement of a structural plate and a cover plate in a three-dimensional view, FIG. 14 is a structural plate according to FIG. 13 from above, FIG. 15 is a cover plate according to FIG. 13 from above, FIG. 16 is an arrangement of a structural plate and a cover plate in a three-dimensional view, FIG. 17 is a structural plate according to FIG. 16 from above, FIG. 18 is a cover plate according to FIG. 16 from above, FIG. 19 is a section of a view of a structural plate, FIG. 20 is an arrangement of a structural plate and a cover plate in a three-dimensional view, FIG. 21 is a structural plate according to FIG. 20 from above, FIG. 22 is a cover plate according to FIG. 20 from above, FIG. 23 is an arrangement of a structural plate and a cover plate in a three-dimensional view.

DETAILED DESCRIPTION

Figures 25, 26:
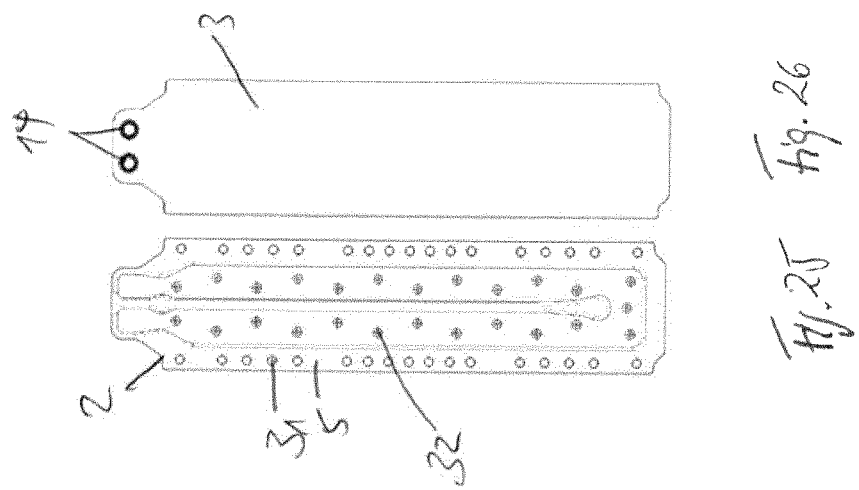
FIG. 25 is a cover plate according to FIG. 23 from above.
FIG. 26 is a respective section of a structural plate for comparing an open elongate hole with a closed elongate hole.

FIG. 1 shows an exploded view of a cooling plate 1 with a structural plate 2 and a cover plate 3. The cover plate 3 and the structural plate 2 have an approximately identical planar basic shape. The cover plate 3 is preferably designed planar or only with minor three-dimensional structuring. The structural plate 2 is formed with a channel-like recess 4, which is preferably impressed into the structural plate 2. The channel-like recess 4 is surrounded in the structural plate 2 by a raised edge region 5 which advantageously encloses the channel-like recess 4 completely in the plane of the raised edge region 5. The raised edge region 5 is formed on three sides 6, 7, 8 of the structural plate 2 as a widened flange which extends in a plane. On a fourth side 9, the raised edge region 5 is designed as a raised, rather narrow edge or flange.

In the exemplary embodiment of FIG. 1, the channel-like recess 4 is designed as a U-shaped channel-like recess, which is formed from two essentially parallel limbs 10, 11, which are designed to be connected to each other at one of their end regions 12. The two limbs 10, 11 are circumferentially surrounded by the raised edge region 5, so that they are closed off to the outside. The two limbs 10, 11 are also separated from one another by a raised web 13. The web 13 and the edge region 5 have the same height so that the cover plate 3 can rest on the edge region 5 as well as on the web 13 and can be soldered to these. According to the invention, the channel-like recess 4 can also have more than one simple deflection, so that it is designed S-shaped or multiple S-shaped. The channel-like recess 4 can also simply be designed in the form of an I-shape without a deflection.

At an end region of the cover plate 3, passage openings and connection elements 14, such as connecting pieces, are arranged in order to communicate with the end regions 15 of the flow channel, which is formed by the channel-like recess 4 in order to allow a fluid to flow through the cooling plate 1. As an alternative to the configuration of the passage openings and connection elements 14 in the cover plate 3, the passage openings and connection elements 14 can also be arranged on the structural plate 2 or on the structural plate 2 and on the cover plate 3, respectively.

In order to fix the cover plate 3 and the structural plate 2 relative to one another, during soldering the two plates 2, 3 are placed in a device, such as a soldering frame, wherein mounting openings 16, 17, 18, 19 are formed in the plates 2, 3, through which fixing pins can engage in order to be able to fix the cover plate 3 to the structural plate 2.

A respective mounting opening 16, 18 in the structural plate 2 and in the cover plate 3 is designed in each case as a round hole. The respective other mounting opening 17, 19 is designed as an elongate hole.

The respective mounting openings 16, 18 and 17,19 are in alignment with one another when the cover plate rests on the structural plate in order to pass a fixing pin through the two openings 16, 18 and 17, 19.

According to the exemplary embodiment of FIGS. 1 to 3, the round hole is arranged as a mounting opening 16, 18 in the center of the plates 2, 3 on their respective line of symmetry. If the plates 3 are not symmetrical, the respective round hole 16, 18 can advantageously still be arranged on the center line or near the center line. The respective round hole is arranged close to one narrow side of the plates 2, 3, on which the connection elements 14 are also arranged. The round hole 18 is arranged centrally in the raised web 13. The web 13 has a widening in the region of the round hole 18, so that a certain predeterminable edge is provided around the round hole in order to achieve a good seal against the channel.

The respective elongate hole 17, 19 is arranged away from the line of symmetry. In the exemplary embodiment of FIGS. 1 to 3, the elongate hole 19 is arranged in the region of the raised edge 5 in the front region of the side 6, which runs essentially perpendicular to the longitudinal sides 7, 8. The elongate hole 19 itself is aligned parallel to the longitudinal direction or the line of symmetry of the plates 2, 3. The elongate hole 17 is arranged in the front edge region in the cover plate 3 so as to be aligned with the elongate hole 19. Both elongate holes 17, 19 are arranged parallel to the longitudinal direction of the web 13, but away from the line of symmetry 20.

FIGS. 4 to 6 show a configuration of a cooling plate 1, which is designed essentially like the cooling plate 1 according to FIGS. 1 to 3. In order to fix the cover plate 3 and the structural plate 2 to one another, during soldering the two plates 2, 3 are likewise placed in a device, such as a soldering frame, wherein in each case mounting openings 16, 18, 21, 22 are formed in the plates 2, 3, through which fixing pins can engage in order to be able to fix the cover plate 3 to the structural plate 2.

A respective mounting opening 16, 18 in the structural plate 2 and in the cover plate 3 is designed in each case as a round hole. The respective other mounting opening 21, 22 is designed as an elongate hole. The respective mounting openings 16, 18 and 21, 22 are aligned with one another when the top plate 3 rests on the structural plate 2 in order to be able to pass a fixing pin through the two openings 16, 18 and 21 22.

According to the exemplary embodiment of FIGS. 4 to 6, the round hole is arranged as a mounting opening 16, 18 in the center of the plates 2, 3 on their respective line of symmetry 20. If the plates 2, 3 are not symmetrical, the respective round hole 16, 18 can nevertheless be advantageously arranged on the center line or near the center line. The respective round hole 16, 18 is arranged close to one narrow side of the plates 2, 3, on which the connection elements 14 are also arranged. The round hole 18 is arranged centrally in the raised web 13. The web 13 has a widening in the region of the round hole 18, so that a certain predeterminable edge is provided around the round hole in order to achieve a good seal against the channel.

The respective elongate hole 21, 22 is arranged away from the line of symmetry 20. In the exemplary embodiment of FIGS. 4 to 6, the elongate hole 21 is arranged in the raised edge region 5 in the front region of the longitudinal side 8. The elongate hole 21 itself is aligned parallel to the longitudinal direction or the central line or the line of symmetry 20 of the plates 2, 3. The elongate hole 22 is arranged in the front lateral edge region in the cover plate 3 such that it is aligned with the elongate hole 21. Both elongate holes 21, 22 are arranged parallel to the longitudinal direction of the web 13, but away from the line of symmetry 20.

As an alternative to the embodiments of FIGS. 1 to 6, the openings designed as a round hole or elongate hole could also be arranged elsewhere. The first mounting opening, which is designed as a round hole, can also be arranged away from the line of symmetry in the region of the raised edge region, wherein the second mounting opening designed as an elongate hole is arranged on the line of symmetry in the region of the raised web. FIGS. 1 to 6 show that the elongate hole is arranged in one of the longitudinal regions or that the elongate hole is arranged in one of the transverse regions. Alternatively, the round hole may also be arranged in one of the longitudinal regions, or the round hole may be arranged in one of the transverse regions.

FIGS. 7 to 9 show an embodiment similar to the embodiment of FIGS. 1 to 3, wherein instead of a respective elongate hole 17, 19, in the exemplary embodiment shown in FIGS. 7 to 9, two elongate holes 17, 19 are arranged in the structural plate 2 and in the cover plate 3. In this case, the respective elongate holes 17, 19 are arranged away from the line of symmetry. However, these are advantageously arranged symmetrically to the line of symmetry 20. In the exemplary embodiment of FIGS. 7 to 9, the respective elongate hole 19 is arranged in the region of the raised edge 5 in the front region of the side 6. The respective elongate hole 17 itself is aligned parallel to the longitudinal direction or the center line or the line of symmetry 20 of the plates 2, 3. The respective elongate hole 19 is arranged in the front lateral edge region in the cover plate 3 such that it aligns with the elongate hole 17. The elongate holes 17, 19 are arranged parallel to the longitudinal direction of the web 13, but away from the line of symmetry 20.

FIGS. 10 to 12 show an exemplary embodiment similar to the embodiment in FIGS. 4 to 6, wherein instead of one respective elongate hole 21, 22, the embodiment of FIGS. 10 to 12 show two elongate holes 21, 22 in the structural plate 2 and in the cover plate 3. In this case, the respective elongate holes 21, 22 are located away from the line of symmetry. However, these are advantageously arranged symmetrically to the line of symmetry 20. In the exemplary embodiment of FIGS. 10 to 12, the respective elongate hole 21 is arranged in the region of the raised edge 5 in the front region of the longitudinal side 8 and 7, respectively. The respective elongate hole 21 itself is aligned parallel to the longitudinal direction or the center line or the line of symmetry 20 of the plates 2, 3. The respective elongate hole 22 is arranged in the front lateral edge region in the cover plate 3 such that it is aligned with the elongate hole 21. Both elongate holes 21, 22 are arranged parallel to the longitudinal direction of the web 13, but are located away from the line of symmetry 20.

FIGS. 13 to 15 show an exemplary embodiment similar to the exemplary embodiment of FIGS. 7 to 9, wherein instead of two closed elongate holes 17, 19 in the embodiment of FIGS. 13 to 15, in each case two elongate holes 23, 24 open on one side are arranged in the structural plate 2 and in the cover plate 3. In this case, the respective elongate holes 23, 24 are likewise arranged away from the line of symmetry. However, these are advantageously arranged symmetrically to the line of symmetry 20. In the exemplary embodiment of FIGS. 13 to 15, the respective open elongate hole 23 is arranged in the region of the raised edge 5 in the front region of the side 6. The respective elongate hole 23 itself is aligned parallel to the longitudinal direction or the center line or the line of symmetry 20 of the plates 2, 3. The respective elongate hole 24 is arranged in the front lateral edge region in the cover plate 3 such that it is aligned with the elongate hole 23. The elongate holes 23, 24 are arranged parallel to the longitudinal direction of the web 13, but away from the line of symmetry 20. The elongate holes 23, 24 are open on one side so as to be U-shaped with an edge open on one side, wherein the open edge is arranged in the short side 6 of the raised edge 5 or in the cover plate.

FIGS. 16 to 19 show an exemplary embodiment similar to the exemplary embodiment of FIGS. 1 to 3, wherein in the exemplary embodiment of FIGS. 16 to 19, an elongate hole 23, 24 open on one side is arranged in the structural plate 2 and in the cover plate 3, instead of a closed elongate hole 17, 19. In this case, the elongate holes 23, 24 are also arranged away from the line of symmetry: In the exemplary embodiment of FIGS. 16 to 19, the open elongate hole 23 is arranged in the region of the raised edge 5 in the front region of the side 6. The respective elongate hole 23 itself is aligned parallel to the longitudinal direction or the center line or the line of symmetry 20 of the plates 2, 3. The respective elongate hole 24 is arranged in the front lateral edge region in the cover plate 3 such that it is aligned with the elongate hole 23. The elongate holes 23, 24 are arranged parallel to the longitudinal direction of the web 13, but away from the line of symmetry 20. The elongate holes 23, 24 are open on one side so as to be U-shaped with an edge open on one side, wherein the open edge is arranged in the short side 6 of the raised edge 5 or in the cover plate. FIG. 19 shows that the raised edge region 5 can be narrower in the case of an open elongate hole 23. This can be used to reduce the required installation space.

In an exploded view, FIGS. 20 to 22 show a further exemplary embodiment of a cooling plate 1 with a structural plate 2 and a cover plate 3. The cover plate 3 and the structural plate 2 have an approximately identical planar basic shape. The cover plate 3 is preferably designed planar or only with minor three-dimensional structuring. The structural plate 2 is formed with a channel-like recess 4 which is preferably impressed into the structural plate 2. The channel-like recess 4 is surrounded in the structural plate 2 by a raised edge region 5 which advantageously encloses the channel-like recess 4 completely in the plane of the raised edge region 5. The raised edge region 5 is formed on three sides 6, 7, 8 of the structural plate 2 as a widened flange which extends in a plane. On a fourth side 9, the raised edge region 5 is designed as a raised, rather narrow edge or flange.

In the exemplary embodiment of FIGS. 20 to 22, the channel-like recess 4 is again formed as a U-shaped channel-like recess, which is formed from two essentially parallel limbs 10, 11 which are connected to each other at one of their end regions 12. The two limbs 10, 11 are circumferentially surrounded by the raised edge region 5, so that they are closed off to the outside. The two limbs 10, 11 are also separated from one another by a raised web 13. The web 13 and the edge region 5 have the same height so that the cover plate 3 rests on the edge region 5 as well as on the web 13 and can be soldered to these. According to the invention, the channel-like recess 4 can also have more than one simple deflection, so that it is designed S-shaped or multiple S-shaped. The channel-like recess 4 can also be designed simply in the form of an I-shape without a deflection.

At an end region of the cover plate 3, passage openings and connection elements 14, such as connecting pieces, are arranged in order to communicate with the end regions 15 of the flow channel formed by the channel-like recess 4 in order to allow a fluid to flow through the cooling plate 1. As an alternative to the formation of the passage openings and connection elements 14 in the cover plate 3, the passage openings and connection elements 14 can also be arranged on the structural plate 2 or on the structural plate 2 and on the cover plate 3, respectively.

In order to fix the cover plate 3 and the structural plate 2 to one another, the two plates 2, 3 are placed in a device during soldering, such as a soldering frame, wherein in each case mounting openings 25, 26, 27, 28 are formed in the plates 2, 3 through which fixing pins can engage in order to be able to fix the cover plate 3 to the structural plate 2.

A respective mounting opening 25, 26 in the structural plate 2 and in the cover plate 3 is designed in each case as a round hole. The respective other mounting opening 27, 28 is designed as an elongate hole.

The respective mounting openings 25, 26 and 27, 28 are aligned with one another when the cover plate rests on the structural plate in order to pass a fixing pin through the two openings 25, 26 and 27, 28.

According to the exemplary embodiment of FIGS. 20 to 22, the round hole is arranged as a mounting opening 25, 26 on the side of the plates 2, 3, away from the line of symmetry 20, in a raised edge region in the vicinity of the connections 14 or laterally on the cover plate 3. The elongate hole 27, 28, on the other hand, is situated on the line of symmetry 20. The respective elongate hole 27, 28 is arranged in the vicinity of one of the narrow sides of the plates 2, 3, and this way, the elongate hole 28 is arranged at an end region of the web 13, which is the end region of the web 13 away from the connection elements 14. The web 13 has a widening in the region of the elongate hole 28 so that a certain predeterminable edge is provided around the elongate hole 28 in order to achieve a good seal against the channel.

FIG. 23 shows a section of a structural plate 2 in which a web is inserted. The elongate hole 28 is arranged at the end region 29 of the web 13, as is already shown in FIG. 20. In this case, the web 13 is widened around the elongate hole 28.

Instead of arranging the round hole 18 on the opposite end region 30, as shown in FIGS. 1, 4, 7, 10, 13 and 16, the round hole 18 can also be moved closer to the end region 29 and be arranged between the end regions 29 and 30. This is shown in FIG. 23.

Alternatively, a plurality of round holes 18 may also be provided along the web 13, which can be used as needed to receive a fixing pin.

Figure 24:
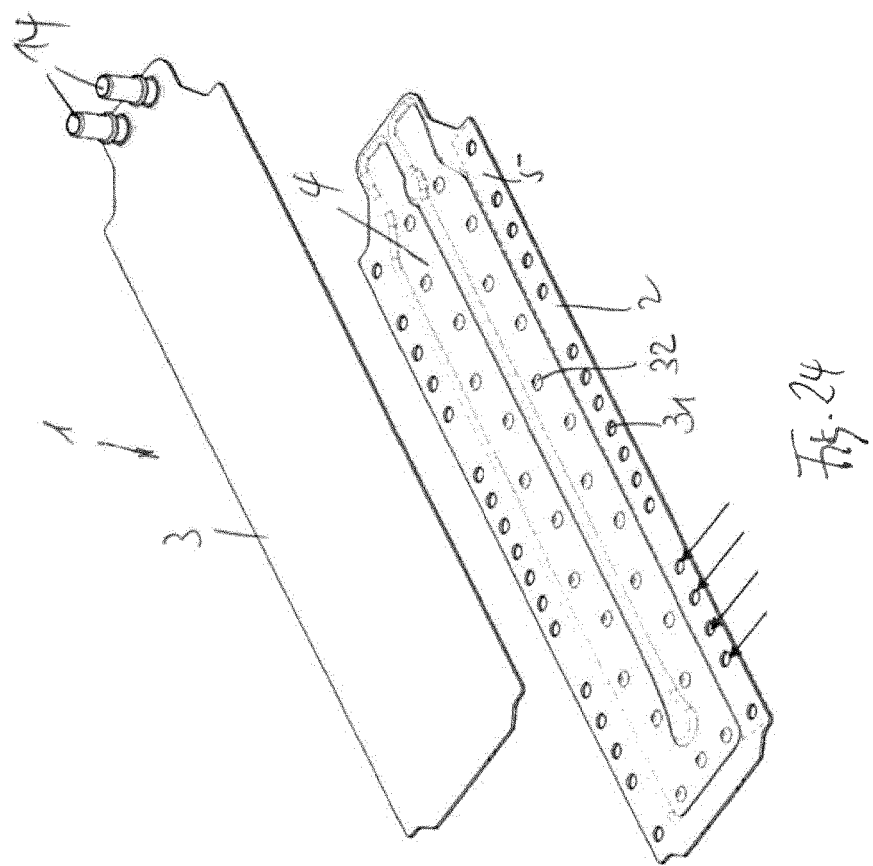
FIG. 24 is a structural plate according to FIG. 23 from above.

FIGS. 24 to 26 show a structural plate 2 and a cover plate 3, which can be used for the exemplary embodiments of FIGS. 1 to 23, wherein the position of the round hole and the elongate hole are not yet fixed and thus still selectable according to the invention. It can be seen that a plurality of further openings 31 are provided in the raised edge region 5. In this case, the arrangement of the further openings in the raised edge region 5 is arranged uniformly, irregularly or distributed in groups so that an enlarged surface results over the raised edge region 5 which leads to a better soldering of the raised edge region 5 to the cover plate 3.

In all exemplary embodiments, as also in FIG. 24, the optional feature is shown that the structural plate 2 and/or the cover plate 3 have impressions 32 in the region of the channel-like recess 4, which protrude into the channel. These can be designed such that they only partially protrude into the channel or that they abut the opposite plate in order to be soldered there.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cooling plate for battery cooling, the cooling plate comprising:
    a structural plate that has a channel-like recess which is surrounded by a raised edge region; and
    a cover plate that rests on the raised edge region and covers the channel-like recess in order to form a channel;
    openings with connection elements arranged thereon being arranged in the structural plate and/or in the cover plate for introducing a fluid into the channel and for discharging a fluid from the channel;
    first mounting openings, the first mounting openings including a round hole being provided in the structural plate and a round hole being provided in the cover plate; and
    second mounting openings, the second mounting openings including an elongate hole being provided in the structural plate and an elongate hole being provided in the cover plate,
    wherein the round hole in the structural plate and the round hole in the cover plate align with one another for receiving a pin for fixing the structural and cover plates during a soldering process and the elongate hole in the structural plate and the elongate hole in the cover plate align with one another for receiving another pin for fixing the structural and cover plates during the soldering process, and
    wherein at least one of the first mounting openings or the second mounting openings are arranged away from a line of symmetry of the structural plate and the cover plate.

2. The cooling plate according to claim 1, wherein at least one of the first mounting openings or the second mounting openings are arranged on the line of symmetry of the structural plate and the cover plate, and wherein the other of the first mounting openings or the second mounting openings are arranged away from the line of symmetry.

3. The cooling plate according to claim 1, wherein the first mounting openings and the second mounting openings are arranged away from the line of symmetry of the structural plate and the cover plate.

4. The cooling plate according to claim 1, wherein the channel-like recess is configured in a U-shaped manner with two essentially parallel limbs that are connected to each other at one of their end regions and that are surrounded by the raised edge region, and wherein the two limbs are separated from one another by a raised web.

5. The cooling plate according to claim 4, wherein the first mounting openings are arranged on the line of symmetry in the region of the raised web, and the second mounting openings are arranged away from the line of symmetry in a region of the raised edge region.

6. The cooling plate according to claim 1, wherein the first mounting openings are arranged in a region of the raised edge region away from the line of symmetry, and wherein the second mounting openings are arranged on the line of symmetry in the region of the raised web.

7. The cooling plate according to claim 1, wherein the raised edge region is formed by two longitudinal regions, which are arranged essentially parallel to one limb and two transverse regions connecting the two longitudinal regions.

8. The cooling plate according to claim 7, wherein the elongate hole of the structural plate or the round hole of the structural plate is arranged in one of the longitudinal regions.

9. The cooling plate according to claim 7, wherein the elongate hole of the structural plate or the round hole of the structural plate is arranged in one of the transverse regions.

10. The cooling plate according to claim 1, wherein the elongate hole of the structural plate is arranged in a longitudinal region or in a transverse region of the raised edge region or wherein the structural plate includes two of the elongate holes hole of the structural plate, a respective one of the two of the elongate hole being arranged in each of the longitudinal regions.

11. The cooling plate according to claim 10, wherein the two of the elongate hole are configured as open on one side or closed.

12. The cooling plate according to claim 4, wherein the raised web has a widening in a region of the insertion of the round hole of the structural plate or the elongate hole of the structural plate.

13. The cooling plate according to claim 1, wherein a plurality of further openings is provided in the raised edge region.

14. The cooling plate according to claim 13, wherein the plurality of further openings are arranged uniformly, irregularly or distributed in groups in the raised edge region.

15. The cooling plate according to claim 13, wherein the structural plate and/or the cover plate have projecting impressions in a region of the channel-like recess that protrude into the channel.

16. The cooling plate according to claim 1, wherein the elongate hole in the structural plate and the elongate hole in the cover plate are each open-ended, such that an inner surface of each of the elongate hole in the structural plate and the elongate hole in the cover plate is U-shaped.

17. The cooling plate according to claim 12, wherein along a longitudinal direction of the raised web, a majority of the raised web is narrower than the region having the widening.

18. The cooling plate according to claim 1, wherein a longitudinal direction of the elongate hole in the structural plate and a longitudinal direction of the elongate hole in the cover plate are parallel to the line of symmetry.

* * * * *